(12) United States Patent
Daly

(10) Patent No.: US 8,652,294 B2
(45) Date of Patent: Feb. 18, 2014

(54) COMPOSITION AND METHOD OF USE FOR PROTECTING KNIT FABRICS

(76) Inventor: Yla M. Daly, Spring, TX (US)

(*) Notice: Subject to any disclaimer, the term of this patent is extended or adjusted under 35 U.S.C. 154(b) by 0 days.

(21) Appl. No.: 13/485,737

(22) Filed: May 31, 2012

(65) Prior Publication Data

US 2013/0319611 A1    Dec. 5, 2013

(51) Int. Cl.
  *B32B 37/12*    (2006.01)
(52) U.S. Cl.
  USPC ............................................... 156/331.7
(58) Field of Classification Search
  USPC ........................................... 156/331.7
  See application file for complete search history.

(56) References Cited

U.S. PATENT DOCUMENTS

| | | | |
|---|---|---|---|
| 4,994,127 A | * | 2/1991 | Sallenbach ............. 156/64 |
| 2012/0183485 A1 | * | 7/2012 | Belluscio et al. ........ 424/70.16 |

FOREIGN PATENT DOCUMENTS

WO    WO2011039160    *    4/2011    ................ 424/70.16

OTHER PUBLICATIONS

Anderson, Stop a Run in Pantyhose, Nov. 15, 2010 http://web.archive.org/web/20101115053818/http://video.about.com/fashion/Stop-a-Run-in-Pantyhose.htm.*

* cited by examiner

*Primary Examiner* — Michael Orlando
*Assistant Examiner* — Daniel Lee
(74) *Attorney, Agent, or Firm* — Kevin Mark Jones

(57) ABSTRACT

A composition for the protection of sheer hosiery comprising: a styrene polymer; an octylacrylamide/acrylates/butylaminoethyl methacrylate copolymer; a polyurethane-14 AMP-acrylates copolymer; and an AMP-100™ (amino methyl propanol) or triethanolamine emulsifier and surfactant; dissolved in a denatured alcohol/ethanol solvent and contained in a pump spray bottle. The composition to be sprayed on a detected imperfection and the surrounding area, and being allowed to dry, binding in a flexible, natural manner the elongated and broken fibers of the material to the surrounding weave thus preventing further damage to the hosiery.

15 Claims, 2 Drawing Sheets

COMPOSITION AND METHOD OF USE FOR PROTECTING KNIT FABRICS

BACKGROUND OF THE INVENTION

Knit hosiery is worn by women throughout the world. The desire for ultra sheerness results in a material which is easily damaged. The knitting method of producing the fabric in an inexpensive fashion means minor damage may cause a cascading affect which results in an unsightly "run" or "ladder" caused by the continued unraveling of the material's knit.

Hosiery wearers have developed a number of ways to repair minor damages before they become too unsightly. The goal is to save the material from further damage, at least for the day, until the hosiery may be replaced. The fibers are often too fine and too short to be tied or knotted. Pervious solutions have included using nail polish as a means of sticking or gluing the loose ends of the damaged fibers to the surrounding fabric. This solution results in hard inflexible fabric, at the point of the repair, which is unsightly and may be irritating to the skin of the wearer.

Another method of temporarily repairing hosiery has been the application of hair spray to the location of the damage and the surrounding area. The result is that the hair spray creates a bond between the loose fibers and surrounding fabric preventing further "run." One of the problems is because hair spray causes unsightly discoloration of the fabric as the hair spray is formulated to sit on top of the fibers. Note that hair is not the same as the fibers of the fabric so the result is not ideal. The smooth/regular uniformity of the fibers in the fabric makes the undissolved particles of copolymers visible as a film or discoloration on the fabric which would not be evident on hair.

Further, hair spray results in a sticky feeling on the wearer's skin. Also, hair spray utilizes a urethane which results in an inflexible bond between adjacent fibers. As the hosiery continues to be worn, the movement results in the breaking of the bonds basically undoing the fix. Finally, the chemicals in hair spray are not meant for the direct application to the skin or for application in the quantities required for repair of hosiery, resulting in skin irritation and user discomfort or injury.

DETAILED DESCRIPTION OF THE PREFERRED EMBODIMENTS

Figure 1:
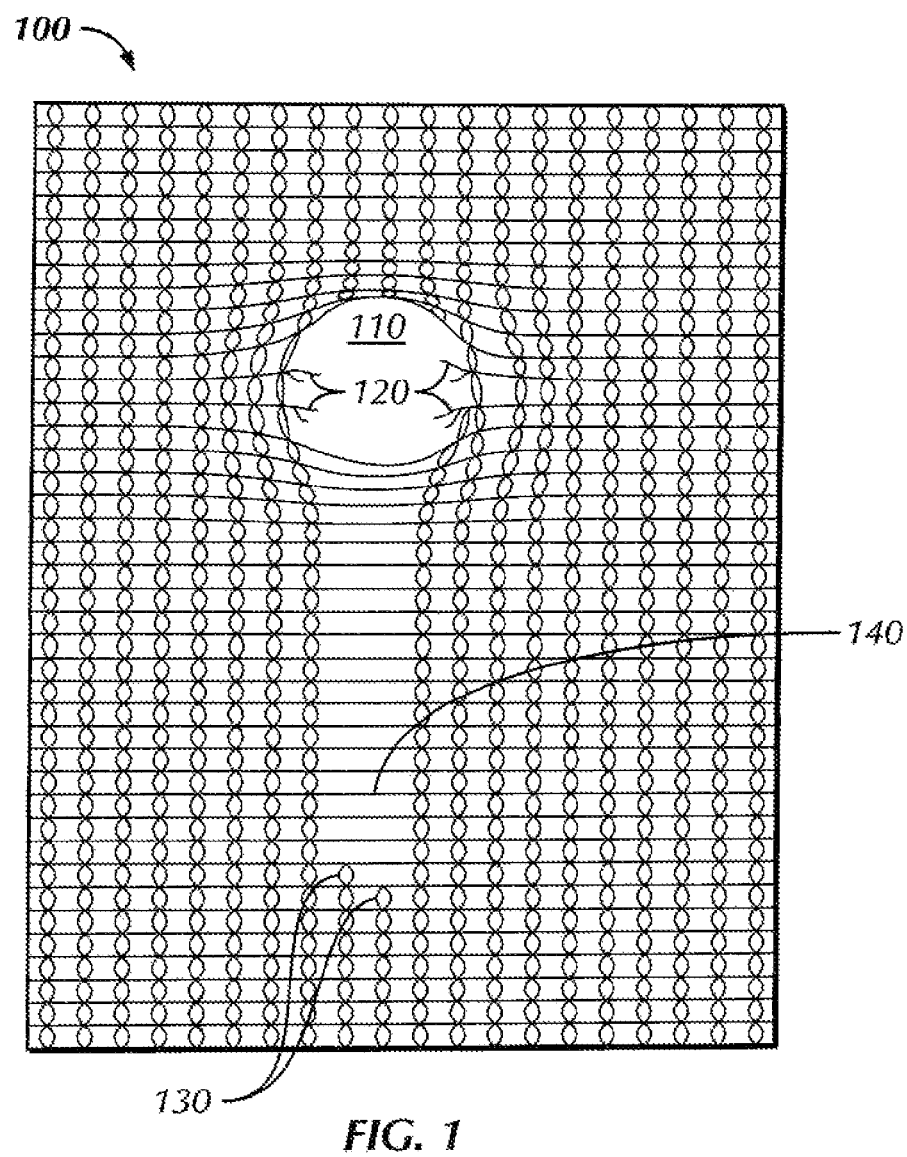
FIG. 1 illustrates woven hosiery with an illustrated "run" in the fabric caused by damage.

Traditional styling products focused on a strong hold which resulted in a stiff hold. The polymers traditionally used were based on acrylate, acetate, methyl vinyl either/maleic anhydride, PVP, or other traditional copolymer technology. While this technology resulted in stiff raspy or crunch hair to hair bonds, it did accomplish the job. When this technology was utilized in hosiery repair, the result was a stiff bond which would break as soon as it was flexed. This often occurred in just a few short strides.

The alternative flexible hold styling products were manufactured with a silicone copolymer chemical. This resulted in weak holding power which would not last the day as a hair styling product, and lasted even less time as a hosiery repair product due to the considerably higher strain placed on hosiery fibers than that placed on hair in event the strongest of breezes.

A recent improvement to styling products utilizes a new polymer composition based on polyurethane and acrylates chemistry which is manufactured under the trade name DynamX®. The International Nomenclature of Cosmetic Ingredients (INCI) name for the polymer is polyurethane-14 AMP-acrylates copolymer. As a hair styling technology the key is a film that is created when the polymer is applied to hair. The film is created by the characteristic optimized physical properties of viscosity and interfacial energy which affect spray particle size and flow ability on hair. These characteristics are similar but distinctly different when applied to hosiery and the fibers that comprise it.

By adding a high molecular weight styrene copolymer at a concentration of 500 to 800 ppm, the formula has a property where the frayed ends of the fibers are joined and encased in polymer preventing them from being caught by the environment and pulling further. As an option fragrance may be added to the composition for a pleasing affect, or simply to cover chemical aromas. The resulting finished composition may be utilized in aerosol cans using propellants known by those skilled in the art, such as, but not limited to propane, butane, dimethylether. In the preferred embodiment hand sprayers with air as the propellant are utilized to allow for carry into environments where aerosols are banned.

To achieve the desired characteristics, several polymers were utilized resulting in the required dissolvability, flexibility, and viscosity. Five (5) to fifteen (15) grams of a first polymer, INCI name Octylacrylamide/Acrylates/Butylaminoethyl Methacrylate Copolymer, (trade name Amphomer®) is mixed with thirty-five (35) to fifty (50) grams of Polyurethane-14 AMP-acrylates (DynamX®) and less than two (2) grams of Styrene copolymer (S-500). The Copolymers are dissolved completely in denatured alcohol which has been charcoal filtered. An emulsifier/surfactant is added to the formulation, AMP-100™ (amino methyl propanol) or Triethanolamine (TEA) in a quantity of five (5) to fifteen (15) grams. By adjusting and optimizing the ratios of the ingredients to achieve desired physical properties of viscosity and interfacial energy, the inventors were able to achieve a characteristic optimization which resulted in a wicking affect into the fibers of the fabric of hosiery such that the composition traveling through the fibers would be drawn along other fibers at joints causing bonds to form on the outside of the fibers.

The optimization is achieved by achieving a low viscosity that allows ultra-fine atomization resulting in smaller droplets that wick into and along the fibers and dry relatively quickly. The anionic nature of the polymer causes the polymer to wick into the fibers on impact to create a maximum amount of well-formed spot joints as surface tension causes the composition at the joints to encase and surround joints of fibers in the fabrics. The bonds have a flexible ability to retain their connection under stresses of fabric flex. The styrene component results in a smoothing of the fibers where, due to the fabric damage, a larger concentration of loose fibers would increase the likelihood of additional snagging and further damage. This smoothening also results in a less noticeable area which helps to hide the original damage to the hosiery necessitating the repair.

FIG. 1 illustrates woven hosiery with an illustrated "run" in the fabric caused by damage. The fabric (100) is created by a knitting process which interlocks the successive levels of the fabric. When damage occurs, such as a tear or hole (110), one or more of the fibers are broken and left frayed (120). The loss of these fibers creates a cascading failure of the fabric (100) as loop (130) after loop (130) releases from its neighbor and opens under the pull of the surrounding fabric (100) to create a "ladder" or "run" (140) in the fabric (100). Binding these loose fibers (120) together and to the surrounding fabric (100) prevents the loops (130) from continuing to slip and thus minimizes or prevents the "ladder" or "run" (140).

Figure 2:
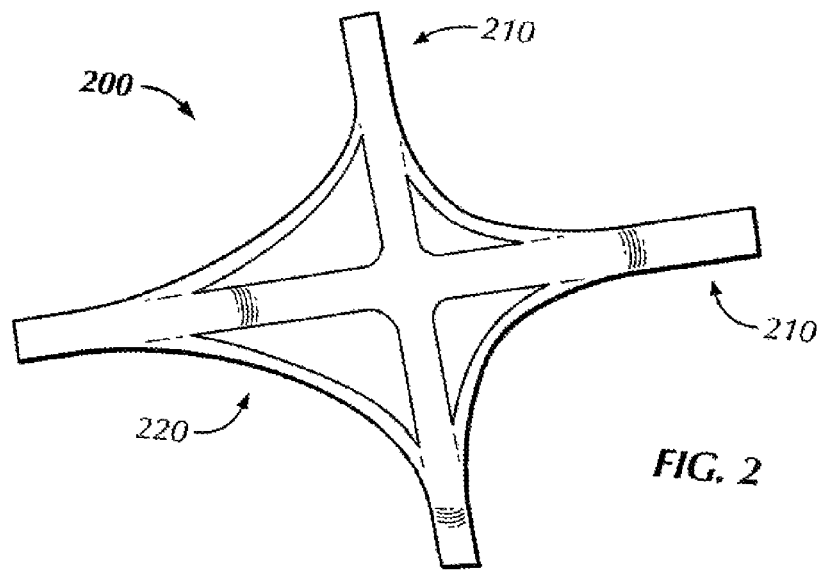
FIG. 2 illustrates an intersection between fibers repaired in accordance with an exemplary embodiment of the invention.

FIG. 2 illustrates an intersection between fibers repaired in accordance with an exemplary embodiment of the invention. This drawing illustrates a close up (200) of the intersection of two fibers (210) which are joined by a bond (220) of the composition described above. The fibers (210) are illustrated as perpendicular to one another, but as one skilled in the art would appreciate, they may be at any angle, and may be touching or simply close enough to be substantially touching such that the composition in its liquid form is drawn between the fiber leaving a bond (220) which stretches from one fiber (210) to another (210) and substantially encases the intersection in a flexible bond (220).

Figure 3:
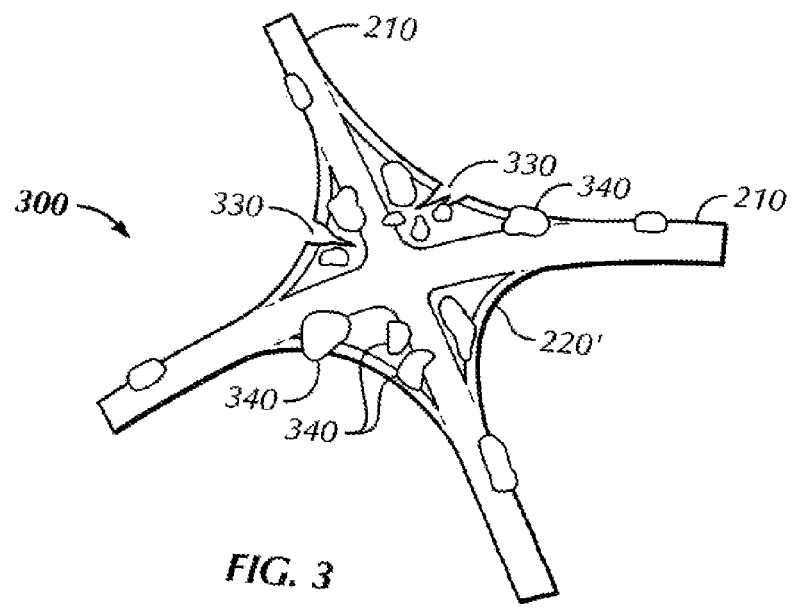
FIG. 3 shows an intersection between fibers as repaired with traditional hair spray.

FIG. 3 shows an intersection between fibers as repaired with traditional hair spray. This drawing illustrates a close up (300) of the intersection of two fibers (210) which are joined by a bond (220') of which is not formulated in accordance with the composition described above. For purposes of this discussion we will presume a standard strong hold hair spray product is illustrated. One skilled in the art would appreciate that there are several formulations of such sprays and many have been the subject of previous patenting attempts. They tended to all suffer from one or more of the issues illustrated here. In this illustration, the fibers (210) are shown in a substantially perpendicular configuration, with the arms of one of the strands flexed to illustrate forces pulling at the bond (220'). The bond is shown to break or tear (330) under such stress because it lacks the flexible hold and strength found in the composition described above. Further, unsightly particles (340) are shown to cover the fibers (210) as well. This is the result of uneven drying or undissolved ingredients. Since previous products were formulated to flow along the surface of the fibers (210) rather than wick inside of the fibers (210), these particles either remained on the surface, or formed there during the drying process. Illustrated here as individual particles, they in actual size appear as a discoloration of the fabric, or as a dust which flakes and fall from the fabric during movement as they are dislodged from the surface of the fibers (210).

The illustrations in accordance with exemplary embodiments of the present invention are provided as examples and should not be construed to limit other embodiments within the scope of the invention. For instance, heights, widths, and thicknesses may not be to scale and should not be construed to limit the invention to the particular proportions illustrated. Additionally some elements illustrated in the singularity may actually be implemented in a plurality. Further, some element illustrated in the plurality could actually vary in count. Further, some elements illustrated in one form could actually vary in detail. Further yet, specific numerical data values (such as specific quantities, numbers, categories, etc.) or other specific information should be interpreted as illustrative for discussing exemplary embodiments. Such specific information is not provided to limit the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for protecting sheer hosiery comprising; detecting an imperfection in the hosiery's weave; applying to the weave a composition for securing the fibers of the weave at and near the imperfection, wherein the composition comprises a three polymer compound dissolved in a solvent; and at least one of the polymers is a high molecular weight styrene copolymer being present in a concentration of at least 500 ppm and less than 800 ppm; allowing the composition to dry and blend with fibers of the weave to become invisible to the eye.

2. The Method, as described in claim 1 wherein the composition comprises, as one of the polymers polyurethane-14 and/or aminomethyl propanol(AMP) acrylates.

3. The Method, as described in claim 1 wherein the composition comprises, as one of the polymers octylacrylamide/acrylates/butylaminoethyl methacrylate copolymer.

4. The Method, as described in claim 1 wherein the composition further comprises an emulsifier and surfactant.

5. The Method, as described in claim 4 wherein the emulsifier and surfactant is triethanolamine or amino methyl propanol (AMP).

6. The Method, as described in claim 1 wherein the imperfection comprises an elongated stitch.

7. The Method, as described in claim 1 wherein the imperfection comprises one or more broken fibers.

8. The Method, as described in claim 1 wherein said composition is hypoallergenic.

9. The Method, as described in claim 1 wherein said dry composition is invisible to the unaided eye.

10. The Method, as described in claim 1 wherein said three polymer compound is transparent.

11. The Method, as described in claim 1 wherein said secured fibers of the weave are flexibly secured.

12. The Method, as described in claim 11 wherein said secured fibers allow natural stretch of the hosiery weave.

13. The Method, as described in claim 1 wherein applying is by means of an aerosol spray.

14. The Method, as described in claim 13 wherein said aerosol spray is delivered by a pump spray system.

15. A method for protecting sheer hosiery comprising; detecting an imperfection in the hosiery's weave; applying an aerosol spray of a composition to the weave for securing the fibers of the weave at and near the imperfection; wherein the composition comprises a styrene polymer, wherein the styrene polymer is a high molecular weight styrene copolymer being present in a concentration of at least 500 ppm and less than 800 ppm; a polyurethane-14 and/or aminomethyl propanol (AMP), acrylates copolymer; a octylacrylamide/acrylates/butylaminoethyl methacrylate copolymer; aminomethyl propanol emulsifier and surfactant; and an Alcohol/Ethanol solvent; allowing the composition to dry.

* * * * *